United States Patent [19]
Koike et al.

[11] Patent Number: 5,200,840
[45] Date of Patent: Apr. 6, 1993

[54] IMAGE PROCESSING APPARATUS

[75] Inventors: Yuzo Koike; Hidekazu Sekizawa, both of Yokohama; Naofumi Yamamoto, Tokyo, all of Japan

[73] Assignee: Kabushiki Kaisha Toshiba, Kawasaki, Japan

[21] Appl. No.: 549,435

[22] Filed: Jul. 6, 1990

[30] Foreign Application Priority Data

Jul. 7, 1989 [JP] Japan ................................. 1-176081
Nov. 15, 1989 [JP] Japan ................................. 1-294879

[51] Int. Cl.$^5$ .................................................. H04N 1/40
[52] U.S. Cl. .................................... 358/451; 358/453
[58] Field of Search .............. 358/448, 451, 452, 462, 358/463, 464, 465, 466, 467, 471, 458, 453

[56] References Cited

U.S. PATENT DOCUMENTS

| | | | |
|---|---|---|---|
| 4,661,843 | 4/1987 | Sekizawa et al. | 358/75 |
| 4,895,431 | 1/1990 | Tsujiuchi et al. | 358/125 |
| 5,023,919 | 6/1991 | Wataya | 358/166 |
| 5,072,291 | 12/1991 | Sekizawa et al. | 358/75 |

FOREIGN PATENT DOCUMENTS

| | | |
|---|---|---|
| EP-A-0367418 | 5/1990 | Europ. Pat. Off. |
| EP-A-0372950 | 6/1990 | Europ. Pat. Off. |
| 0248069 | 12/1985 | Japan ................. 358/448 |

OTHER PUBLICATIONS

Patent Abstracts of Japan Vol 12 No. 217 (E-624) (3064) June 21, 1988 & JP-A-63 013 578 (Canon) Jan. 20, 1988

Primary Examiner—Edward L. Coles, Sr.
Assistant Examiner—Jerome Grant II
Attorney, Agent, or Firm—Oblon, Spivak, McClelland, Maier & Neustadt

[57] ABSTRACT

An image processing apparatus comprises an image-area discriminating circuit for discriminating the attribute of an image, such as whether it is a character/line image or a dot image or whether or not it is an isolated point noise, and outputting a discrimination result, an enlargement/reduction processing circuit for performing enlargement/reduction processing on an image, and a filtering circuit for controlling the spatial frequency response of an image in accordance of a discrimination signal.

11 Claims, 14 Drawing Sheets

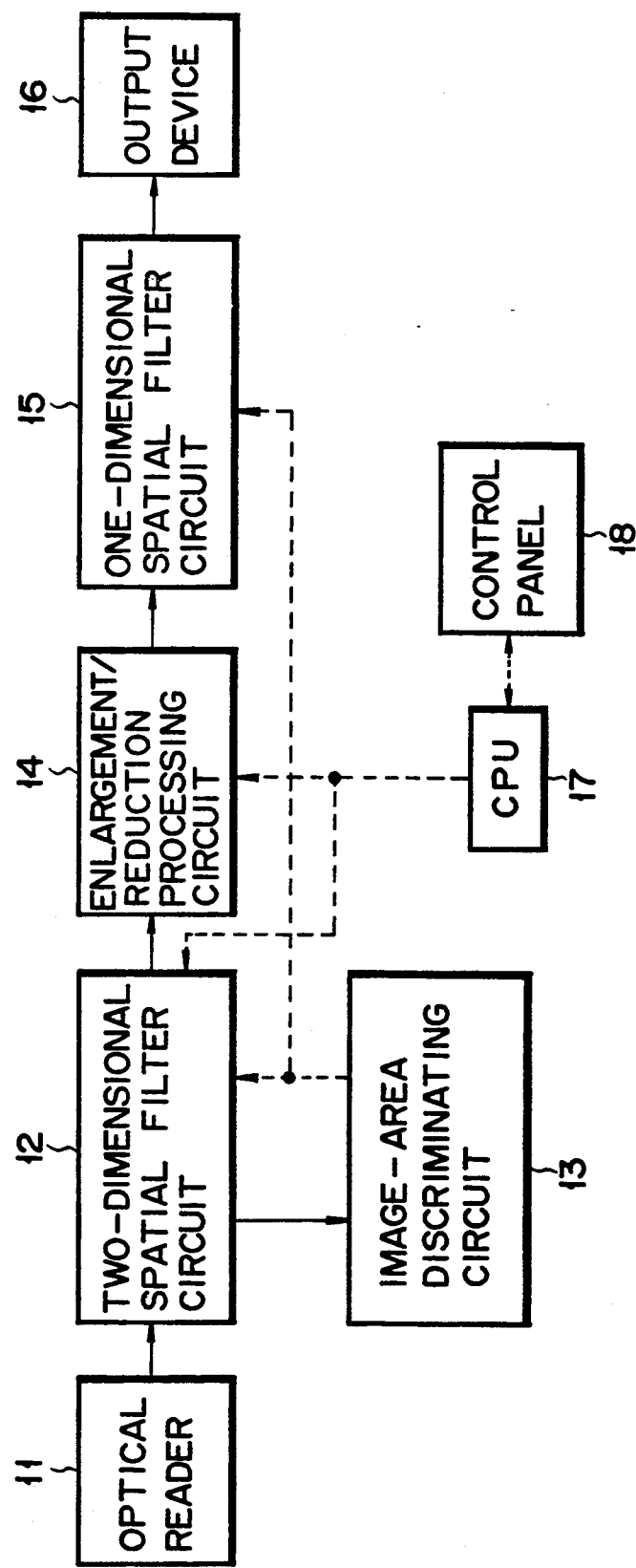
F I G. 1

SPATIAL FREQUENCY (f/fS) →

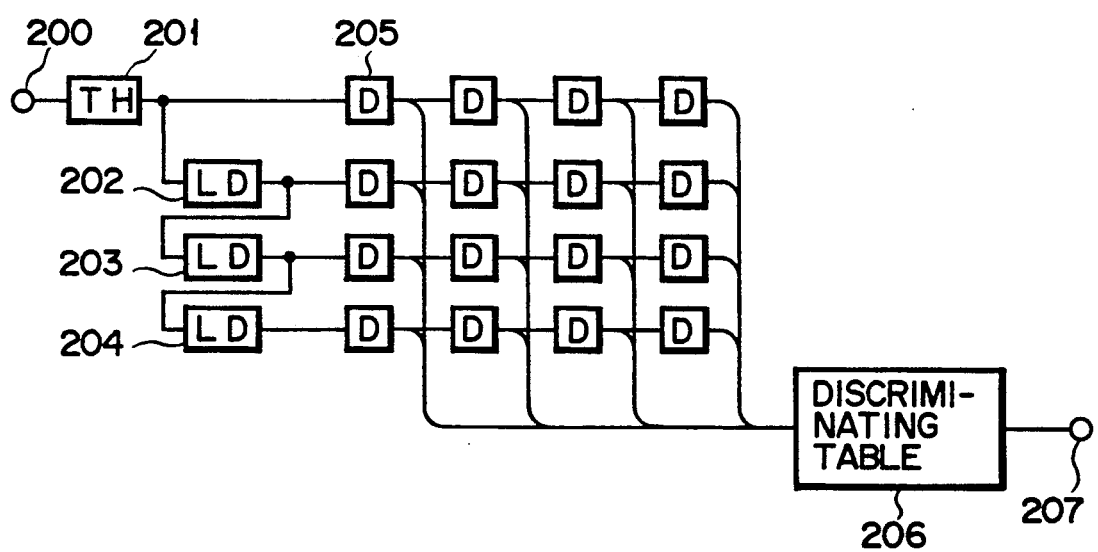
F I G. 5

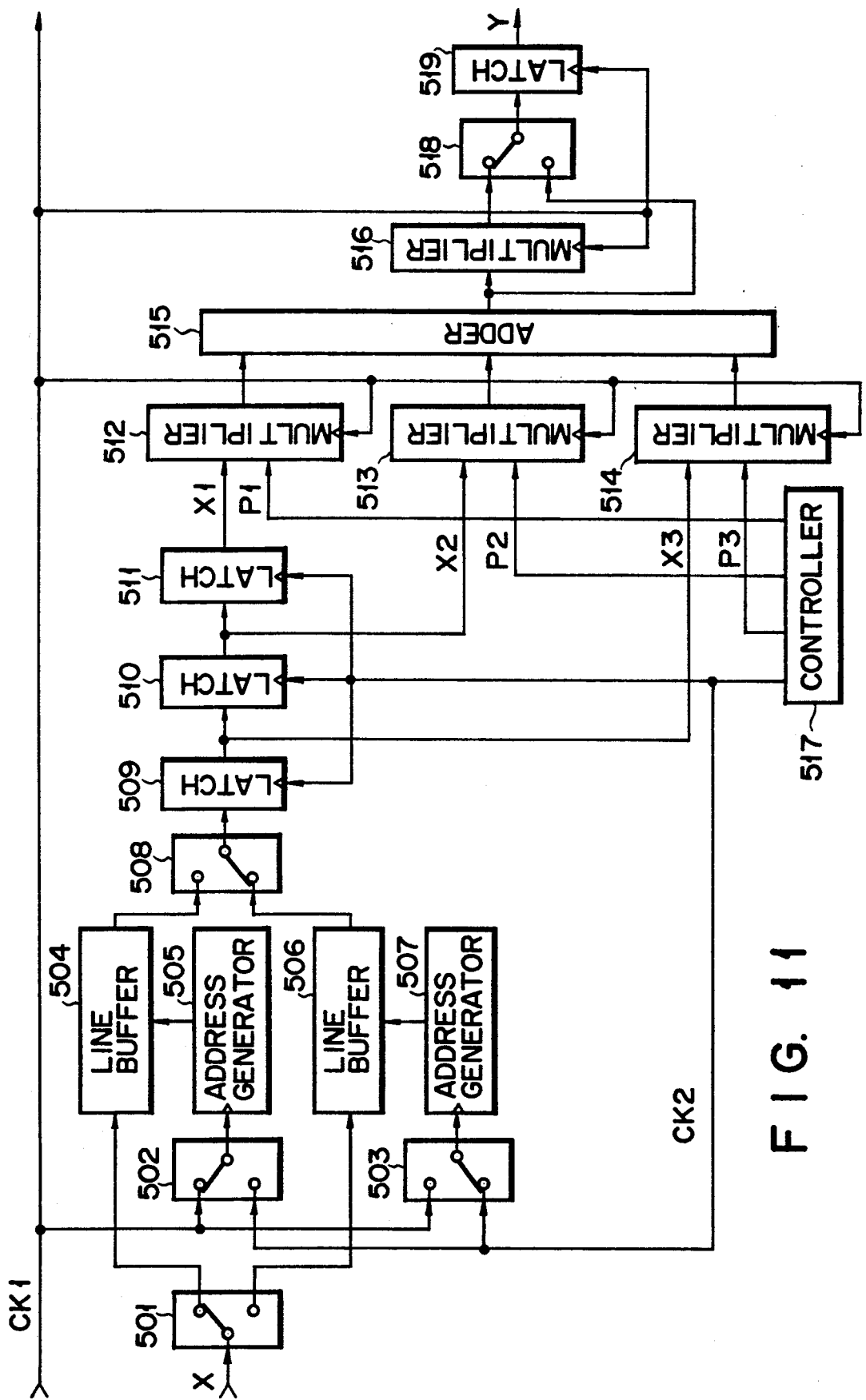
F I G. 11

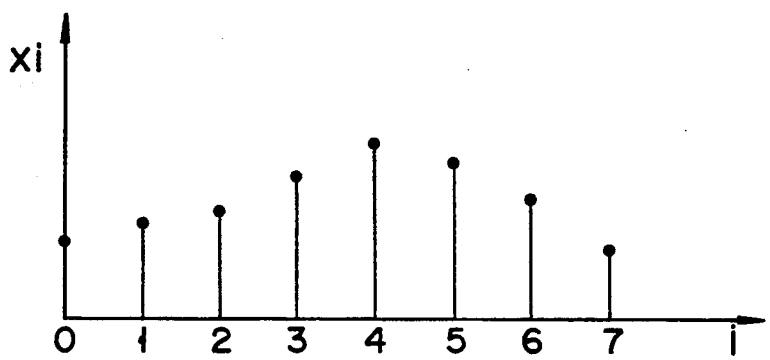
FIG. 13A
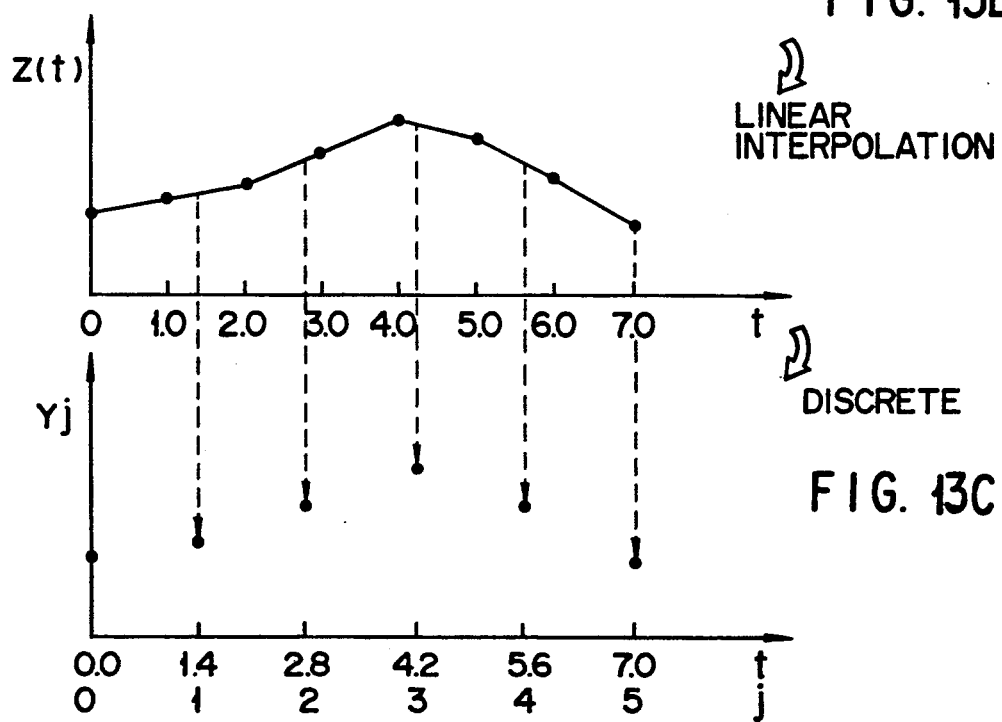
FIG. 13B
FIG. 13C

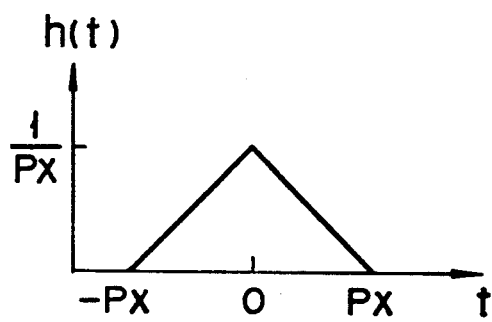
F I G. 14A
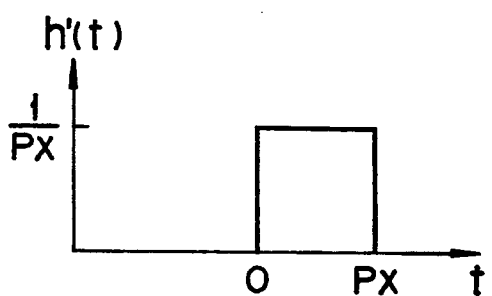
F I G. 14B
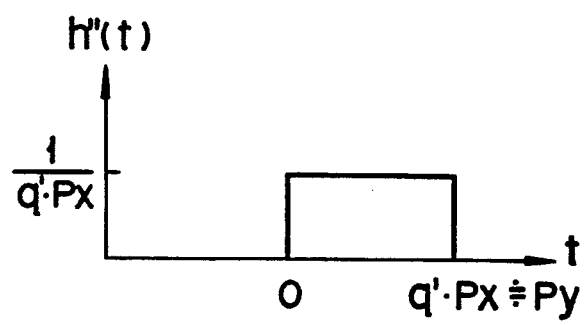
F I G. 14C

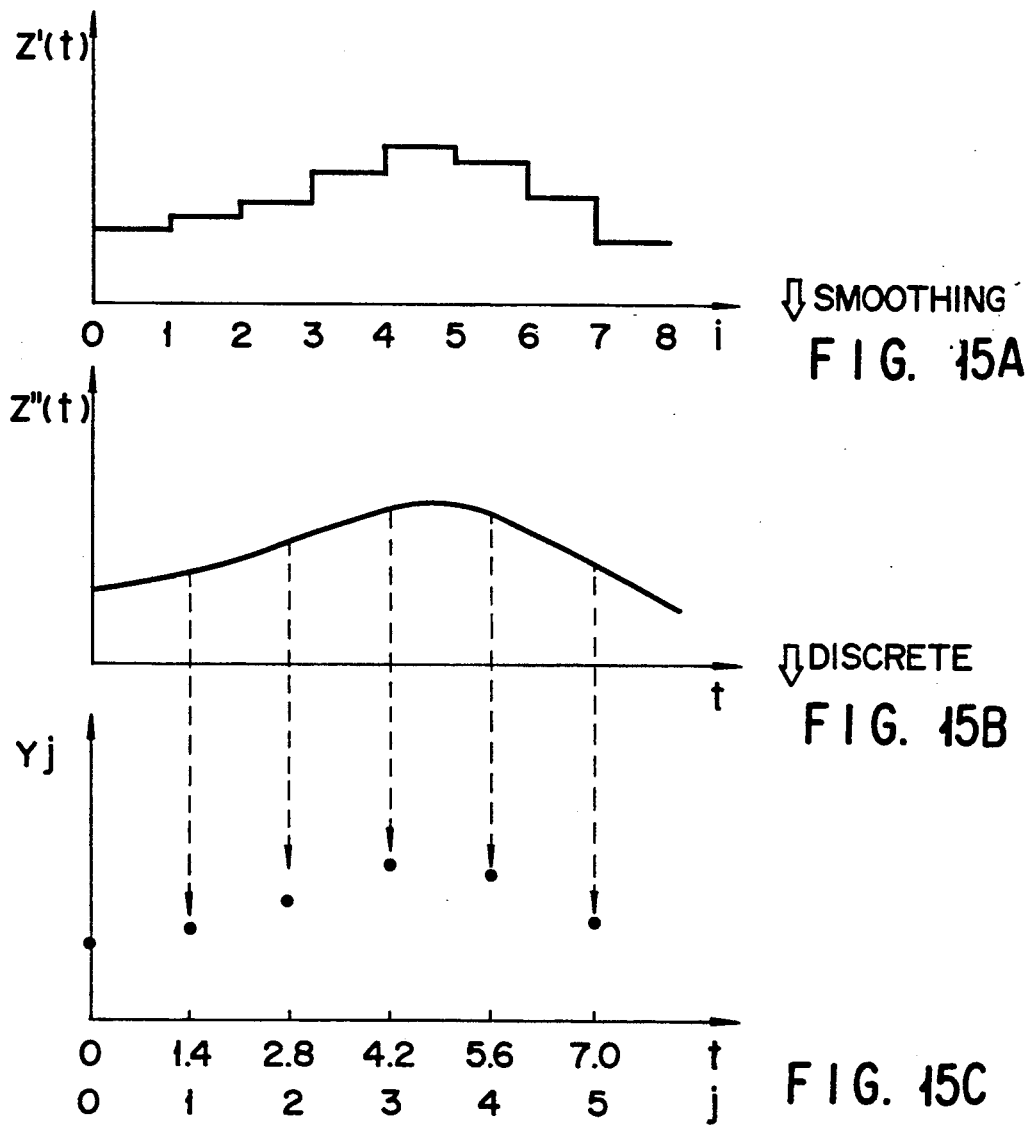
FIG. 15A
FIG. 15B
FIG. 15C
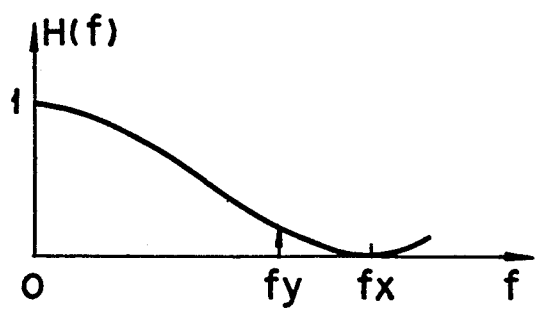
FIG. 16A
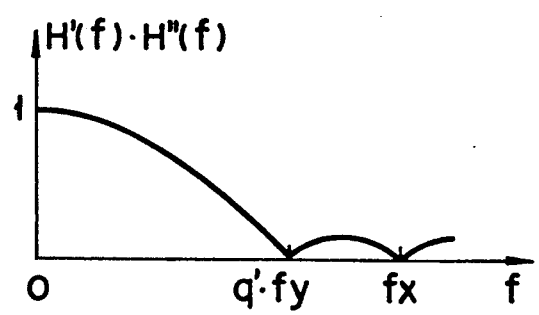
FIG. 16B

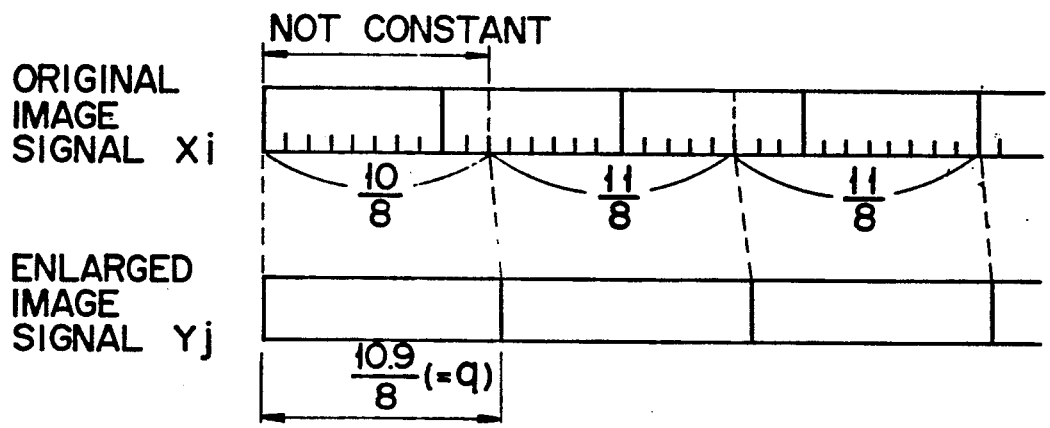
F I G. 17A
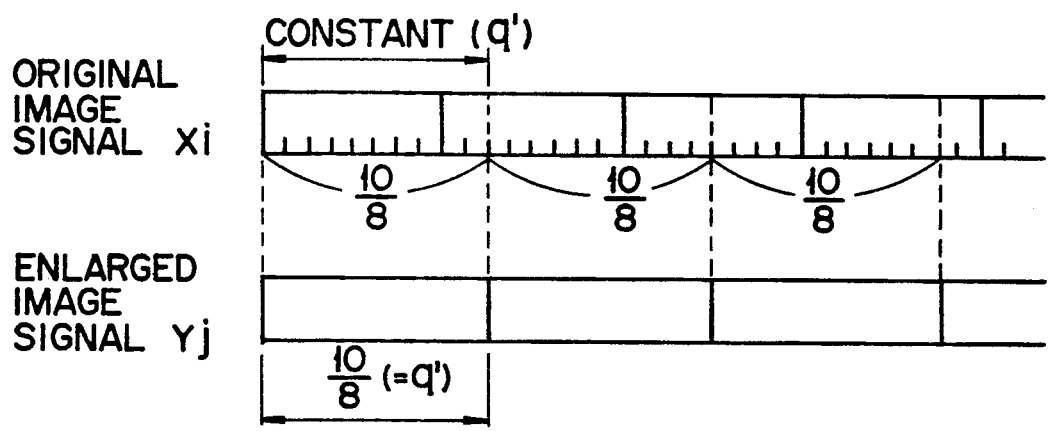
F I G. 17B
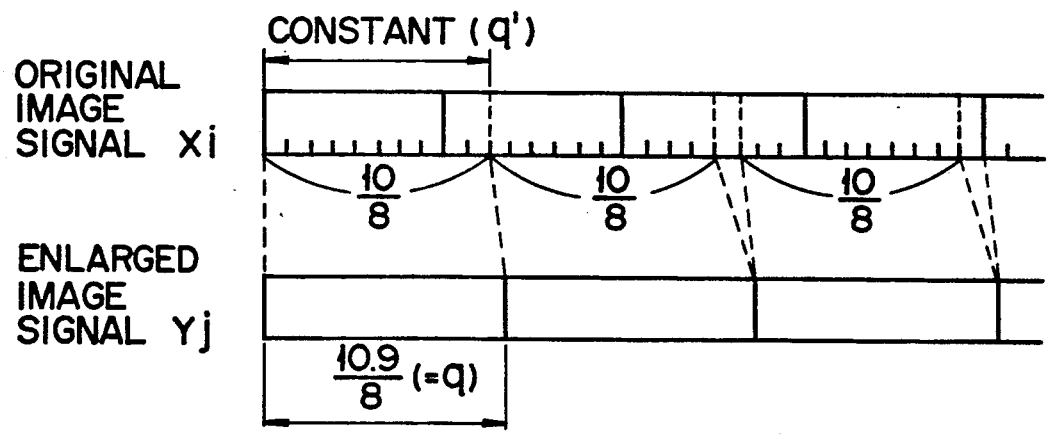
F I G. 17C

IMAGE PROCESSING APPARATUS

BACKGROUND OF THE INVENTION

1. Field of the Invention

The present invention relates to an image processing apparatus for suppressing deterioration of an image at the time of enlargement or reduction.

2. Description of the Related Art

In a conventional image processing apparatus which scans an image with an image input device and provides a hard copy or the like of the image after subjecting the image to enlargement/reduction processing, the response of a high-frequency component is impaired due to the response of a scanning lens and the size of the sensor opening, providing a blurred output image. In addition, the output image is often blurred due to not only a reduction in the response in the image input device but also the algorithm for the enlargement/reduction processing. Particularly, when an enlargement ratio is increased, it is difficult to suppress blurring using any algorithm for enlargement/reduction processing, so that the edge of a character image or the like is blurred, making it significantly awkward. There is a technique known which combines enlargement/reduction processing and high-frequency area emphasis for emphasizing the high-frequency component to suppress the reduction in the response of the high-frequency component, thereby preventing generation of enlargement/reduction-originated blurring (see Published Unexamined Japanese Patent Application No. 62-257276.

However, the high-frequency area emphasis may rather make an image awkward, depending on images. For instance, when a dot image is expanded, its dot pattern is easily seen, and when the high-frequency component of the image is emphasized, the dot pattern alone becomes prominent, making it difficult to identify the original image. Further, reduction of a dot pattern is likely to be a cause for moire noise.

Even emphasizing the high-frequency component of an image after enlargement of the image does not provide good effect to suppress image deterioration. If image reduction is done after the high-frequency component of the image is emphasized, not only the moire noise is generated but the reproduced image would have many rough portions.

As described above, with the use of the prior art image processing apparatus which compensates for reduction in high spatial frequency caused by enlargement/reduction processing to uniformly emphasize the high-frequency component, an awkward cyclic pattern or moire noise is rather emphasized, or the desired rich effect cannot be obtained, depending on the type of images.

SUMMARY OF THE INVENTION

Accordingly, it is an object of the present invention to provide an image processing apparatus which can effectively prevent blurring and emphasis of a cyclic pattern, moire noise or the like from occurring due to enlargement/reduction processing, and can considerably improve the image quality.

According to the present invention, there is provided an image processing apparatus comprising an image-area discriminating circuit for discriminating from an image signal an attribute of an image, such as whether it is a character/line image or a dot image or whether or not it is an isolated point noise, and outputting the discrimination result as an image-attribution signal; an enlargement/reduction processing circuit for subjecting the image to enlargement/reduction processing; and a filtering process circuit for controlling a spatial frequency response of the image based on the image-attribution signal.

According to the invention, there is also provided an image processing apparatus comprising a response control circuit for controlling a response of a spatial frequency at the proximity of ½ of a Nyquist frequency of an image signal based on an image-attribution signal; and an enlargement/reduction circuit for performing enlargement/reduction processing on the image signal whose spatial frequency response has been controlled by the control circuit.

According to this invention, there is further provided an image processing apparatus for processing an image signal every time an image signal for one line is input, comprising a two-dimensional spatial filter circuit for subjecting an image signal to two-dimensional spatial filtering based on an image-area discrimination signal to control a spatial frequency response; an image-area discriminating circuit for discriminating an attribute of an image based on a processing result of the filter circuit and outputting the discrimination result as the image-attribution signal; an expansion/compression processing circuit for performing one-dimensional enlargement/reduction processing on the processing result of the two-dimensional spatial filter circuit; and a one-dimensional spatial filter circuit performing one-dimensional spatial filtering on the image signal subjected to enlargement/reduction processing by the enlargement/reduction processing circuit, based on the image-attribution signal to thereby control a spatial frequency response.

According to the present invention, the image-area discriminating circuit discriminates from a signal of a scanned image, the attribute of an image, such as whether it is a character/line image or a dot image or whether or not it is an isolated point noise, and outputs an image-attribution signal. If this image-attribution signal indicates a character/line image, for example, the high-frequency component of the image is emphasized. At this time,, it is desirable that the degree of emphasis be also controlled by a magnification. For instance, the degree of emphasis becomes larger for expansion. If the image-attribution signal indicates a dot image or an isolated point, the image is subjected to low-pass filtering.

Accordingly, for a character/line image, even if the magnification increases, a clear image without blur can be acquired. In the case of a dot image or an isolated point noise, moire noise or the like does not occur even at the time of image compression; even at the time of image expansion, a high-quality image can be acquired without emphasizing the cyclic pattern.

By performing enlargement/reduction processing after high-frequency area emphasis of the spatial frequency at the proximity of ½ of the Nyquist frequency, the effect of the high-frequency area emphasis at the time of enlargement is improved and moire noise or roughness noise at the time of reduction can effectively be eliminated.

In addition, one-dimensional enlargement/reduction is executed after the two-dimensional spatial filtering, and the subsequent compensation for the spatial frequency response can be done by one-dimensional filtering alone. This can facilitate real-time processing for each line.

Further, according to the present invention, in enlarging or reducing an image, pixel position Aj (corresponding to a re-discrete position) of an enlarged-image or reduced-image signal is computed at a high accuracy (n-bit precision), the pixel position Aj is rounded up to m-bit precision (m<n) to acquire a first coarse pixel position signal Aj', then a second coarse pixel position signal Bj' is acquired from the first coarse pixel position signal Aj and a specified magnification rounded up or the rounded reciprocal of the specified magnification. An enlarged/reduced-image signal Yj is obtained by determining weight coefficients a and b with respect to, for example, the reference pixel range i ($k \leq i \leq l$) of the original digital image signal and the original image signals Xk, Xl on both ends of the reference pixel range, from the first and second coarse pixel position signals Aj' and Bj'.

An enlargement/reduction processor according to one aspect of this invention comprises accumulating means for accumulating a predetermined initial value by a constant determined by a specified magnification and outputting a pixel position signal of an n-bit precision; a circuit for rounding up the pixel position signal from the accumulating means at an m-bit precision (m<n) to acquire a first coarse pixel position signal; a circuit for acquiring a second coarse pixel position signal from the first coarse pixel position signal and a coarse enlargement/reduction ratio obtained by rounding up the specified enlargement/reduction ratio; a first multiplier for multiplying an original image signal by an interpolation coefficient determined by first and second coarse pixel position signals to provide a plurality of multiplication results; an adder for adding these multiplication results; and a second multiplier for multiplying the addition result of the adder by a normalizing coefficient determined by the coarse enlargement/reduction ratio and outputting a digital image signal undergone an enlargement/reduction.

According to another aspect, the first and second multipliers are replaced with multiplying means for multiplying the original digital image signal by an interpolation coefficient determined by the first and second coarse pixel position signals and the coarse enlargement/reduction ratio to provide a plurality of multiplication results. In this case, a digital image signal undergone an enlargement/reduction is output by adding these multiplication results by the adding means.

In the above variable multiplication, since smoothing is done with an interval approximately equal to the re-discrete interval of a digital image signal, moire noise hardly occurs as will be described later.

Although the interpolation is carried out with a smaller number of bits using the rounded coarse pixel position signal and coarse enlargement ratio, the pixel position signal Aj of the enlarged- and reduced-image signal itself that determines the accuracy of the enlargement/reduction is computed at high precision, thus making it possible to set the enlargement/reduction ratio at high accuracy without increasing the number of operations.

According to the conventional projection method, the second pixel position signal is computed from Aj+1, the sum of the interpolation coefficients used for obtaining the enlarged image is not constant from the rounding-up relation between the first pixel position signal Aj and the second pixel position signal Aj+1. This alters the DC gain to cause a lattice noise. According to this invention, however, as the second coarse pixel position signal Bj is computed from the rounded first coarse pixel position signal Aj' and the rounded enlargement/reduction ratio, which makes constant the reference region for the original image per pixel of an enlarged/reduced image. This sets the sum of the interpolation coefficients constant and does not cause the lattice noise.

That is, as this invention employs simple processing with fewer operations, the enlargement/reduction can be executed with a highly-accurate enlargement/reduction ratio while suppressing the moire noise or lattice noise.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of the first embodiment of an image processing apparatus according to the present invention;

FIG. 5 is a detailed block diagram of an image-area discriminating circuit in the apparatus shown in FIG. 1;

FIG. 11 is a block diagram showing the structure of an enlargement/reduction processing circuit shown in FIG. 7;

FIGS. 13(a–c) illustrate sequences of processing for a linear terpolation;

FIGS. 14A through 14C are diagrams illustrating impulse responses for a linear interpolation and the enlargement/reduction according to the present invention;

FIGS. 15(a–c) illustrate sequences of processing for the enlargement/reduction according to the present invention;

FIGS. 16A and 16B are diagrams illustrating a linear interpolation and a frequency response for the enlargement/reduction according to the present invention; and FIGS. 17A through 17C are diagrams illustrating reference regions of an enlarged/reduced image and the original image in various variable enlargement/reduction process.

DETAILED DESCRIPTION OF THE PREFERRED EMBODIMENTS

Figure 2:
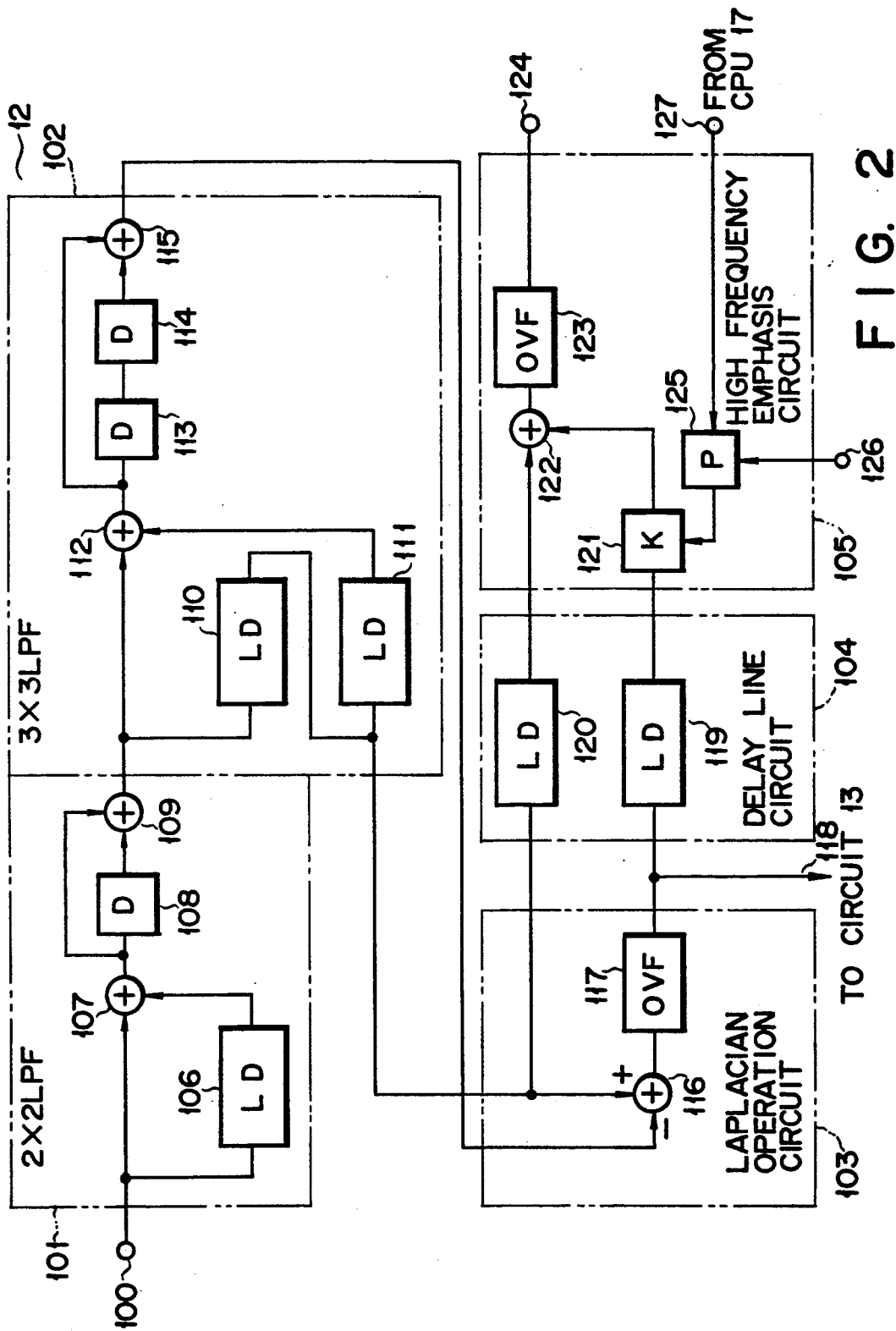
FIG. 2 is a detailed block diagram of a two-dimensional spatial filter circuit in the same apparatus.

Referring to FIG. 1, an optical reader 11, which comprises an optical system and a line sensor, scans image information from the original line by line. For instance, the optical reader 11 comprises a color optical reader or black/white optical reader as disclosed in Published Unexamined Japanese Patent Application Nos. 59-19266 and 61-135238. Image data scanned by the optical reader 11 is input to a two-dimensional spatial filter circuit 12.

The spatial filter circuit 12 emphasizes the high-frequency component in order to compensate for reduction in response of the high-frequency range which is caused by the shape of the optical system and the sensor opening of the optical reader 11. This spatial filter circuit 12 also suppresses the high-frequency component depending on images, i.e., it performs low-pass filtering.

An image-area discriminating circuit 13 receives the high-frequency component of image data output from the two-dimensional spatial filter circuit 12 and discriminates the attribute of an image, such as whether it is a character/line image or a dot image or whether or not it is an isolated point noise, based on the received data. The discrimination result is output as an image-attribution signal to the two-dimensional spatial filter circuit 12 and a one-dimensional spatial filter circuit 15. This means that the spatial filter circuits 12 and 15 receive information as to if the edge should be emphasized or blurred.

An enlargement/reduction processing circuit 14 performs one-dimensional expansion/compression on an image signal which has undergone two-dimensional filtering by the spatial filter circuit 12, using a set enlargement/reduction ratio.

The one-dimensional spatial filter circuit 15 has a function to perform one-dimensional filtering on the image signal subjected to the expansion/compression to eliminate moire noise from the image signal. That is, in a case where an output device 16 at the next stage performs the dither method or dot modulation to express the intermediate tone, the output image has a cyclic pattern, and moire noise may occur between the cyclic pattern and the image data. In this respect, the one-dimensional spatial filter circuit 12 discriminates whether or not the image signal represents an image that is easy to cause moire noise, based on an image-attribution signal received from the image-area discriminating circuit 13, and controls the filter characteristic to eliminate the cyclic pattern, which may cause moire noise, from the image signal which has undergone the expansion/compression.

A CPU 17 and a control panel 18 serve to set an enlargement/reduction ratio to control the feeding speed in the optical reader 11 and the output device 16 based on the setting.

The operation of the thus constituted image processing apparatus will be described below.

In this embodiment, every time one line of an image signal is read by the optical reader 11, the following processing is executed. First, an image signal read line by line by the optical reader 11 is subjected to shading correction before being output. In this embodiment, high-frequency area emphasis is performed to compensate for deterioration of the response characteristic caused by the optical system, such as a lens, or deterioration of the response characteristic caused by enlargement/reduction. If there is shading noise (containing much noise of the high-frequency component) due to a variation in sensitivity of the sensor or the like, therefore, this is emphasized to give a very unclear image. Such noise is eliminated in advance.

The image signal subjected to shading correction is input to the two-dimensional spatial filter circuit 12. In this embodiment, enlargement/reduction is executed in the signal processing (interpolation processing) in the enlargement/reduction processing circuit 14 in the length-wise direction (hereinafter referred to as main scanning direction) of the line sensor. In the feeding direction of the line sensor (paper feeding direction of the output device 16: hereinafter referred to as sub-scanning direction), the enlargement/reduction is done by controlling the mechanical feeding speed to alter the number of subroutines in the sub-scanning direction. In the main scanning direction, an image is blurred by the interpolation processing at the time of enlargement. In the sub-scanning direction, since the opening size of the scanning sensor is constant, increasing the number of samples does not increase the high-frequency response and blur still occurs. In view of this, the two-dimensional spatial filter circuit 12 controls the filtering characteristics in the main and sub-scanning directions.

The two-dimensional spatial filter circuit 12 comprises a 2×2 low-pass filter 101, a 3×3 low-pass filter 102, a Laplacian operation circuit 103 and a high-frequency area emphasis circuit 105, as shown in FIG. 2.

First, an image signal input to the low-pass filter 101 from an input terminal 100 is added by an adder 107 to an image signal delayed by one line in a delay line 106. Then, the output of the adder 107 is added by an adder 109 to an image signal, delayed by one pixel by a 1-pixel delay circuit 108. The result of the addition is averaged to ¼ by a circuit (not shown). As a result, the image signal is subjected to 2×2 low-pass filtering.

The 3×3 low-pass filter 102 adds signals of every other line and every other pixel. That is, the input image signal is added by an adder 112 to an image signal delayed by two lines by delay lines 110 and 111. Then, the output of the adder 112 is added by an adder 115 to an image signal, delayed by two pixels by 1-pixel delay circuits 113 and 114. The result of the addition is also averaged to ¼ as per the previous case. Accordingly, a convolution operation is executed by the 2×2 low-pass filter 101 and 3×3 low-pass filter 102.

Figure 3:
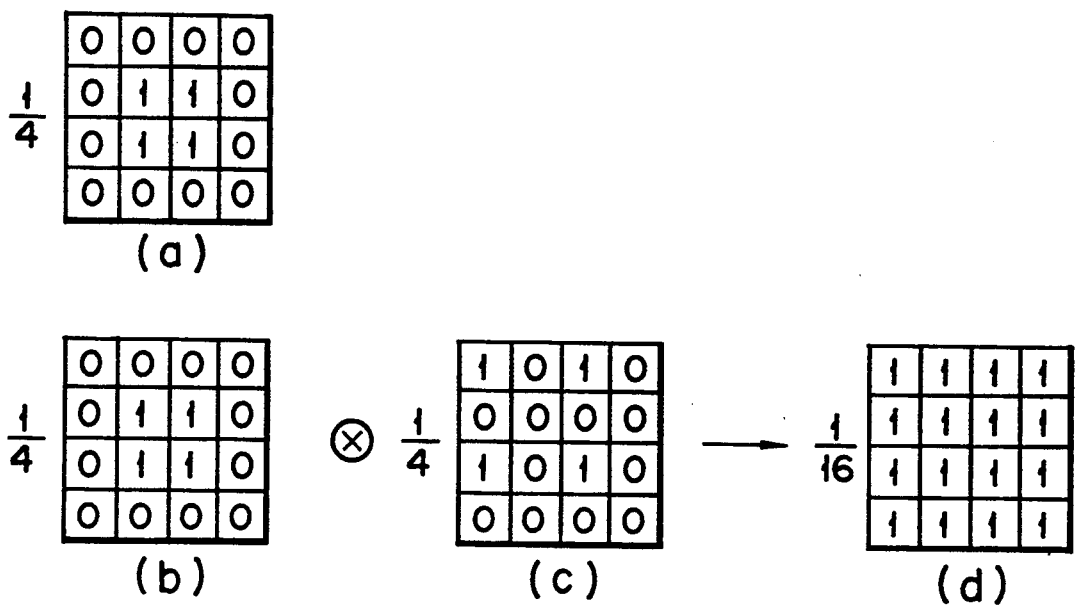
FIG. 3 is a diagram for explaining the operation of the two-dimensional spatial filter circuit.

FIG. 3A illustrates the kernel (size) of the 2×2 low-pass filter 101, and FIGS. 3A through 3D illustrate the kernel of this low-pass filter 101, the kernel of the 3×3 low-pass filter 102 and the kernel of the result of the convolution operation.

The output of the 2×2 low-pass filter 101 and the convolution operation output are subjected to subtraction by an adder 116, and the result is processed in an overflow circuit 117. As a result, a Laplacian signal is obtained.

The acquired Laplacian signal 118 is sent to the image-area discriminating circuit 13. The Laplacian signal 118 and the output signal of the low-pass filter 101 are sent to a delay line circuit 104 in order to be synchronized with the discrimination signal from the image-area discriminating circuit 13. The delay line circuit 104 delays these signals by one line.

The spatial frequency of the delayed output is controlled by the high-frequency area emphasis circuit 105. The convolution operation output is read out from a ROM table 121 and is multiplied by a coefficient (K) determined by the discrimination signal and the enlargement/reduction ratio. The amplified convolution operation output is added to the output of the 2×2 low-pass filter 101 by an adder 122. The result of the addition is subjected to overflow processing by an overflow circuit 123, and is output as a two-dimensional output from an output terminal 124.

With $u=2\pi f/fs$ (fs: sampling frequency), the spatial frequency characteristic H (u, k) of the output of the two-dimensional spatial filter circuit is given by:

$$H(u, k) = \frac{\sin(u)}{u} \{1 + k[1 - \cos(u)]\}$$

Figure 4:
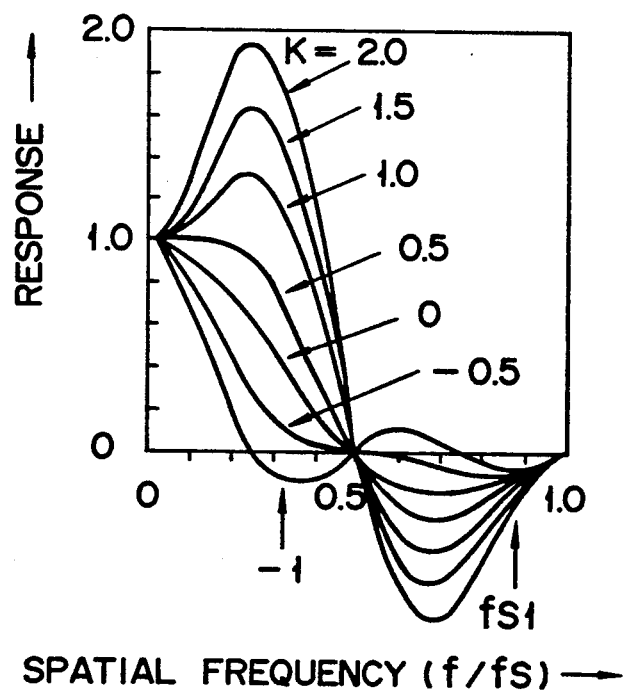
FIG. 4 is a diagram illustrating the response characteristic of the two-dimensional spatial filter circuit.

In the above equation, the spatial frequency characteristic H (u, k) with k varying is as shown in FIG. 4. As should be clear from this diagram, the response is 0 at the Nyquist frequency fs/2, and the response can be increased or decreased by the value of the coefficient (K) at the proximity of ½ of the Nyquist frequency.

For instance, k is set large (k=2) if it is determined that the likelihood of a character is strong by the discrimination signal, and k is set small (k=0) for a dot image. In a case where a cyclic pattern such as the dither method is used in the output device, it is effective to set k smaller (k=−1). For instance, when a 4×4 multi-value dither method is used, setting k=−1 sets the response to 0 at the cyclic component (fs/4) occurred in the output device, making it possible to eliminate the moire noise or the like. In this manner, the coefficient k that determines the response characteristic is set by the table P125. The table P125 outputs a parameter k based on an image-area discrimination signal 126 and a signal 127 representing the enlargement/reduction ratio from the CPU 17. The details of the table P125 will be given later.

Since the two-dimensional spatial filter circuit 12 has the spatial frequency characteristic H (u, k) as shown in FIG. 4, there is the following advantage. The re-sampling frequency fs1 decreases at the time of reduction. For a reduction ratio between 50% and 100%, the component for the re-sampling frequency fs1 is not emphasized much, thus providing an image quality without roughness. Further, the enlargement is performed after execution of the high-frequency area emphasis, so that setting the sampling frequency fs of the input to 16 lp/mm can emphasize the proximity of 4 lp/mm that effectively increases the sharpness of a character. On the other hand, if the high-frequency area emphasis is executed after the enlargement processing, a spatial frequency component (includes much noise) considerably higher than the proximity of 4 lp/mm, the sharpness cannot be improved.

The operation of the image-area discriminating circuit 13 will now be described. This circuit basically discriminates the attribute of an image area from a combination of binary patterns of a Laplacian signal of an image, as disclosed in Published Unexamined Japanese Patent Application No. 60-204177. For instance, the circuit 13 is constituted as shown in FIG. 5. The Laplacian signal 118 output from the Laplacian operation circuit 103 shown in FIG. 2 is input through an input terminal 200 and is compared with a predetermined threshold value in a comparator 201. The binary signal is extracted as a binary pattern of a 4×4 Laplacian signal by 1-bit delay lines 202, 203 and 204 and 16 1-bit 1-pixel latches 205 arranged in 4×4 matrix form. The extracted 16-bit signal is input to a discrimination table 206 which is prepared by statistically checking the properties of a character image and a dot image in advance. That is, if the image is a character/line image, this image is formed by a combination of patterns which are each a collection of consecutive dots. If the image is a dot image, this image is formed by a combination of patterns in which dots are discrete. Therefore, "7" is assigned to a 16-bit pattern like a character image, and "0" is assigned to a pattern like a dot image; those between 0 and 7 are assigned to an image in accordance with the degree of the likelihood to a character image or a dot image. The assignment of values can provide efficient discrimination if the statistical property of the character image and dot image is reflected. For instance, an image including characters and line images of various sizes as a training image and different dot images having different numbers of lines are prepared. For the individual images (character image and dot image), a binary pattern of a 4×4 Laplacian signal is obtained, and a histogram of the frequency of occurrence for each pattern is obtained. Then, the ratio of the frequency of occurrence of a character image to that of a dot image is obtained for each binary pattern of a 4×4 Laplacian signal. The degree of the likelihood to a character or a dot image is set by the level of this ratio, and is stored in the discrimination table 206. In this manner, the scale of the discrimination or a table that is the basis of a discrimination signal is prepared in the discriminating table 206. When a binary pattern of the 4×4 Laplacian signal is input, the discriminating table outputs a large value (7) as a discrimination result if the pattern is easy to generate as in a character, or outputs a small value (0) if it is easy to generate as in a dot image, in accordance with the content of the table prepared in advance based on statistical properties table formed by obtaining the histogram described above. The discrimination result is output through the output terminal 207 to the terminal 126 shown in FIG. 2.

Examples of the coefficient k that changes the response characteristic are illustrated in the following table by the discrimination signal and the enlargement/reduction ratio specified from the control panel.

TABLE

| Discrimination Signal | Coefficient K (Magnification %) | | | | | | | |
|---|---|---|---|---|---|---|---|---|
| | 33% | 50% | 75% | 100% | 150% | 200% | 300% | 400% |
| Likelihood to Dot Image | | | | | | | | |
| 0 | −1 | −1 | −1 | −1 | −1 | −1 | −1 | −1 |
| 1 | −1 | −1 | −0.5 | −0.5 | −0.5 | −0.5 | −0.5 | −0.5 |
| 2 | −0.5 | −0.5 | −0.5 | −0.5 | 0 | 0 | 0 | 0 |
| 3 | −0.5 | −0.5 | 0 | 0 | 0 | 0.5 | 0.5 | 1 |
| 4 | 0 | 0 | 0 | 0.5 | 0.5 | 1 | 1 | 1.5 |

TABLE-continued

| Discrimination Signal | Coefficient K (Magnification %) | | | | | | | |
|---|---|---|---|---|---|---|---|---|
| | 33% | 50% | 75% | 100% | 150% | 200% | 300% | 400% |
| 5 Likelihood to Character | 0.5 | 0.5 | 1 | 1 | 1 | 1.5 | 1.5 | 2 |
| 6 | 1 | 1.5 | 1.5 | 1.5 | 1.5 | 2 | 2 | 3 |
| 7 | 2 | 2 | 2 | 2 | 2 | 2 | 3 | 3 |

When the enlargement ratio is large and the discrimination signal indicates a high likelihood to a character, the high-frequency component is sufficiently emphasized (for example, 400% enlargement ratio). At the time of reduction, the moire noise is easy to occur, the high frequency response is decreased if there is a certain degree of likelihood to a dot, thus suppressing generation of the moire noise (e.g., 50% reduction ratio). If the enlargement ratio is large but an image is a dot image, the high frequency response is decreased to make the dot pattern subdued [discrimination signal=0 (high likelihood to a dot) at 400% magnification]. If the image is likely to be a character, on the other hand, the high-frequency component is strongly emphasized irrespective of the magnification and the image is converted into an image easy to read [discrimination signal=7 (high likelihood to a character)].

It is possible to acquire an image which is free of moire noise when reduced and which is not blurred when enlarged, by changing the coefficient for the high-frequency area emphasis in accordance with the enlargement/reduction ratio and the discrimination result in the character discriminating circuit. According to this embodiment, although the coefficient for the high-frequency area emphasis is controlled referring to both the enlargement/reduction ratio and an image-area discriminating result, it is possible to obtain a certain degree of effect if the coefficient for high-frequency area emphasis is controlled referring only to the image-area discriminating result (refer to U.S. Pat. Nos. 5,072,291 and 4,661,843 for the related technique).

An image signal subjected to two-dimensional filtering based on the result of the image-area discrimination and the enlargement/reduction ratio is then supplied to the enlargement/reduction processing circuit 14.

Figure 6:
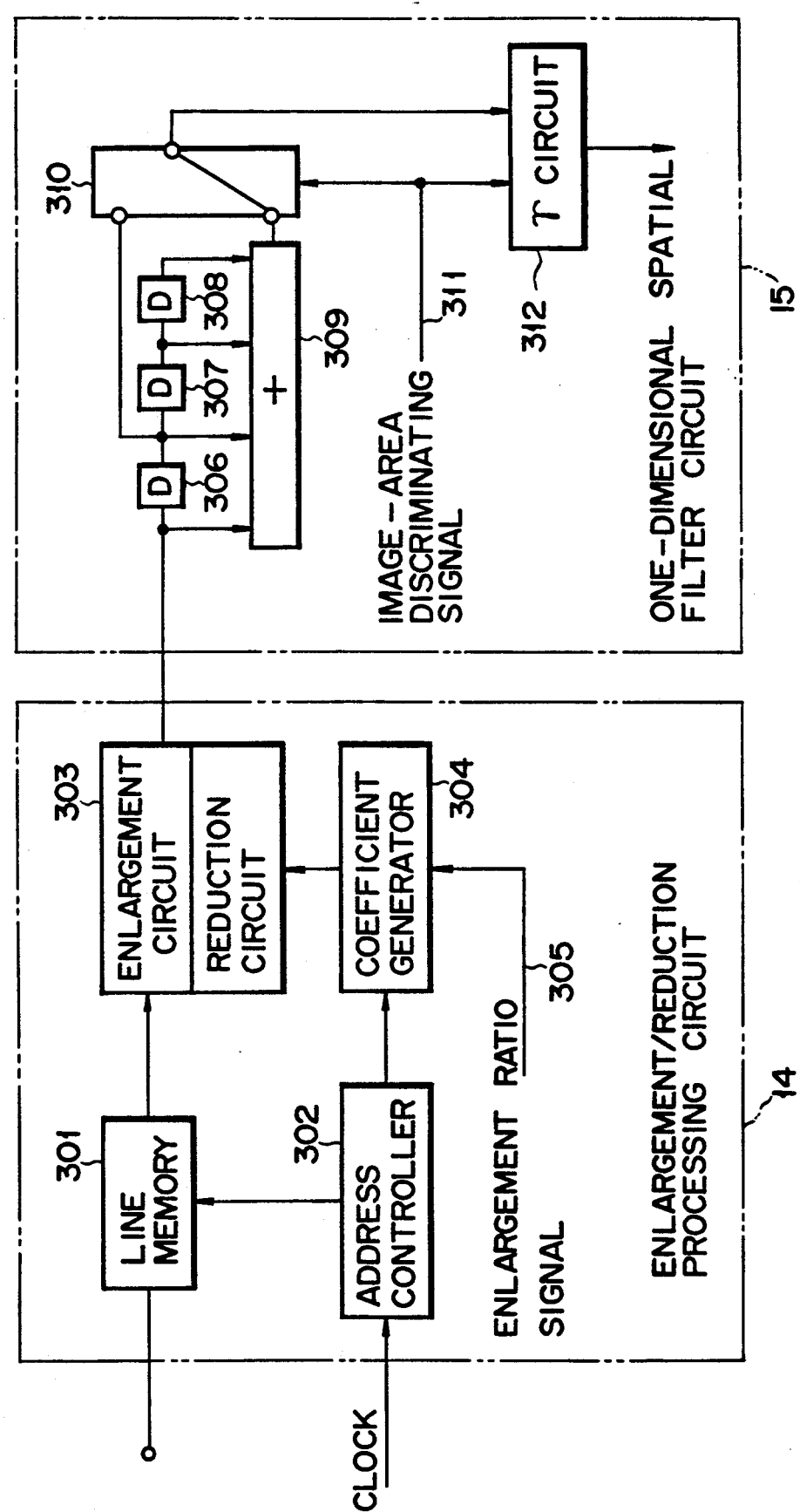
FIG. 6 is a block diagram showing an enlargement/reduction processing circuit and a one-dimensional spatial filter circuit in the sam apparatus.

This processing circuit 14 comprises a line memory 301, an address controller 302, an enlargement/reduction circuit 303 and a coefficient generator 304, as shown in FIG. 6, for example. The time delay resulting from conversion of the number of pixels in the enlargement/reduction circuit 303 is matched and the reference pixel required for interpolation processing is extracted. A read address of the line memory 301 is given to the address controller 302. An image signal output from the line memory 301 is input to the enlargement/reduction circuit 303 where it is subjected to enlargement/reduction processing. In this embodiment, the enlargement processing and the reduction processing are executed with different algorithms, the former by the linear interpolation and the latter by the projection method. The coefficient generator 304 receives an enlargement/reduction ratio signal 305 from the CPU 17 in accordance with the enlargement/reduction ratio specified through the control panel 18 and an address signal from the address controller 302. The coefficient generator 302 prepares the necessary interpolation coefficient for the enlargement/reduction processing based on these signals, and sends the coefficient to the enlargement/reduction circuit 303. Through the above processing, one-dimensional enlargement/reduction processing is executed. The enlargement/reduction processing in the sub-scanning direction is executed by controlling the feeding times of the optical reader 11 and output device 16, as described earlier.

Then, the signal which has undergone the one-dimensional enlargement/reduction processing in the above manner is input to the one-dimensional spatial filter circuit 15. As described earlier, when an image having a cyclic pattern such as a dot image is input, the two-dimensional spatial filter circuit 12 performs low-pass filtering to eliminate the cyclic component that is likely to generate moire noise. When the enlargement/reduction processing is executed in the enlargement/reduction process circuit 14, however, the spatial frequency which is input to the output device 16 changes by the enlargement/reduction ratio, moire noise may occur. Particularly, as the input spatial frequency increases in the reduction processing, it may change to a level which is likely to cause moire noise even if the low-pass filtering is executed in the two-dimensional spatial filter circuit 12. Accordingly, the one-dimensional spatial filter circuit 15 functions to eliminate the spatial frequency which generates this moire noise. The moire noise is likely to occur when the spatial frequency close to the cyclic pattern used in the output device 16 is output. For instance, with the use of the 4×4 pixel multi-value dither method, the signal subjected to the enlargement/reduction processing in the enlargement/reduction processing circuit 14 is delayed by 1-pixel delays 306, 307 and 308, and the resultant signals are input to an adder 309 for moving average. The moving-averaged value is input to one input terminal of a selector 310, which selects a moving-averaged signal only when it is discriminated by the image-area discriminating circuit 311 that a dot image has been input. This selectively eliminates only the spatial frequency which is likely to cause moire noise.

If the enlargement/reduction processing is executed one-dimensional, the spatial frequency in the subscanning direction does not vary at all, so that the one-dimensional filter is sufficient for the subsequent processing, thus eliminating the moire noise. It should be noted that of those spatial frequencies in the subscanning direction, the one which may generate the moire noise has already been eliminated by the two-dimensional spatial filter circuit 12.

Subsequently, the signal processed in the above manner is input to a γ circuit 312, which is provided to increase the sharpness of a character image when the input image is very likely a character. That is, if it is likely a character, the high-frequency area emphasis is executed in the two-dimensional spatial filter circuit 12. If the enlargement ratio particularly is increased, emphasis of the sharpness is more likely to be insufficient. If the high-frequency area emphasis is set unnecessarily strong, the noise component is emphasized and the image may become awkward. In such a case, the image quality is improved if the γ characteristic is made sharp after the high-frequency area emphasis is executed to make the image close to a binary image. If the an image-area discrimination signal 311 represents considerable character likelihood, the γ characteristic of the γ circuit 312 should be set sharp.

Although the image-area discrimination signal 311 is used directly as a switching signal for the selector 310 and γ circuit 312, the output of the table P125 shown in FIG. 2 may be used as the switching signal. In this case, the proper switching signal can be attained also in accordance with the enlargement/reduction ratio. Alternatively, the image-area discrimination signal 311 and the enlargement/reduction ratio table may newly be provided as separate from the table P125 (FIG. 2) so that the proper switching signal can be acquired in accordance with the enlargement/reduction ratio Although the foregoing description of this embodiment has been given with reference to the output device employing the multi-value dither method using 4×4 pixels, a 3×3 pixel multi-value dither method may also effective. In this case, it is desirable that the kernel of the two-dimensional spatial filter be altered to have a characteristic which can provide 0 response at $\frac{1}{3}$ of the sampling frequency. Further, it is preferable that the one-dimensional spatial filter provide 0 response at $\frac{1}{3}$ of the sampling frequency through the low-pass filtering based on the moving average of three pixels.

Although the description of the embodiment has been given with reference to the output device having a cyclic pattern, another type of output device is also effective. For instance, even an output device which can display the intermediate tone by one dot is likely to generate moire noise in the reduction processing. If a dot image is expanded, the dot pattern is also enlarged, and the enlarged dot image becomes prominent due to the response characteristic of eyes, making the image significantly awkward. A character if enlarged should have a sharpness. In such a case, however, it is still effective to change the spatial frequency characteristic or γ characteristic using the enlargement/reduction ratio and the attribute of the image (properties of a character image and an image signal).

Furthermore, the present processing can also apply to a color image, in which case a color image reader should replace the optical reader and an image signal should be output after it is subjected to color conversion processing to be converted into an ink-amount signal in the optical reader. The other part is the same as is done by the previous embodiment. In short, in the color reader, three systems, R, G and B, are simultaneously subjected to signal processing, but after the color conversion, the processing needs to be repeated for the number of color inks of the color output device using a single-color ink amount signal. Accordingly, the present processing can be executed in quite the same manner as done in the previous embodiment. Further, with the use of an output device, such as an ink jet printer, which can provide a simultaneous color output, the processing may be executed with the color signal sequentially switched for each pixel, requiring only a processing for a single color and eliminating the need for a plurality of processing circuits for different colors. It should be noted that delay circuits used in the filter circuit or the like need to be provided for the number of color channels.

As described above, according to this invention, an image-area discrimination signal is acquired by means that discriminates the attribute of an image, such as whether it is a character/line image or a dot image or whether or not it is an isolated point noise, the high-frequency component is emphasized by this image-area discrimination signal, for example, in the case of a character/line image or the low-pass filtering is executed in the case of a dot image or an isolated point noise. If the enlargement ratio is increased for a character/line image, therefore, a clear image can be output without blur. For a dot image, moire noise or the like does not occur even at the time of reduction, and an awkward cyclic pattern or isolated point noise of a dot image or the like is not emphasized even at the time of enlargement, thus providing a high-quality image.

By performing enlargement/reduction processing after high-frequency area emphasis of the spatial frequency at the proximity of $\frac{1}{2}$ of the Nyquist frequency, the sharpness of a character or a line image can be improved at the time of enlargement, and moire noise or roughness noise at the time of reduction can effectively be eliminated.

In addition, if one-dimensional enlargement/reduction is executed after the two-dimensional spatial filtering, the subsequent compensation for the spatial frequency response can be done by one-dimensional filtering alone. This can ensure real-time processing for each line.

A description will now be given of an enlargement/reduction processing which can apply to the enlargement/reduction processing circuit 14.

Figure 7:
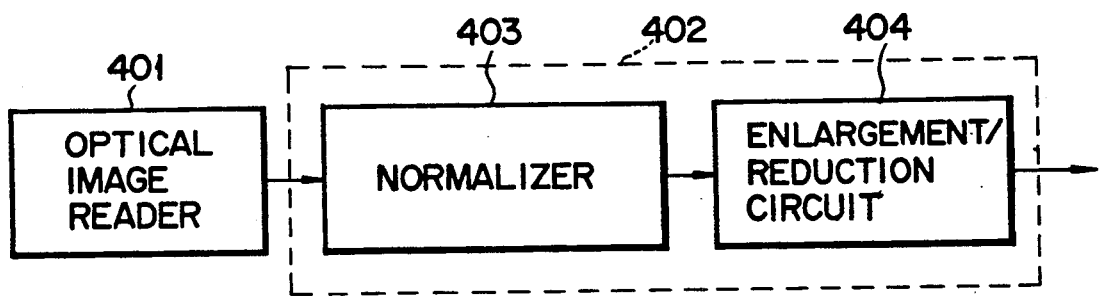
FIG. 7 is a block diagram showing the structure of an image reading device to which this invention is applied.

FIG. 7 illustrates an image input device which scans an image and outputs image data. This image input device comprises an optical image reader 401 and an image signal processor 402.

Figure 8:
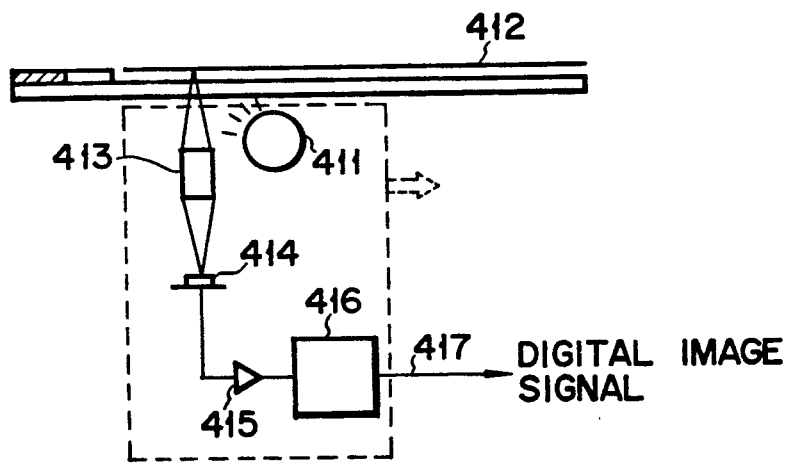
FIG. 8 is a block diagram illustrating the structure of an optical image reader shown in FIG. 7.

As shown in FIG. 8, in the optical image reader 401, a line region of an image of an original 412 irradiated with light from a light source 411 is formed on a light-receiving face of a line sensor 414 by a tight optical system 413 that uses a cylindrical lens array of a refractive index distribution type and is converted into an electric signal. The line sensor 414, which is constituted of a CCD, for example, sequentially outputs one line of an analog image signal through the main scanning. This image signal is amplified by an amplifier 415, is then converted into a digital image signal 417 by an A/D converter 416. Image reading for each line is repeated while moving a carriage having the light source 411 (sub-scanning), optical system 413 and line sensor 414 assembled together in the direction normal to the main scanning direction, so that digital image signals for the entire surface of the original 412 are output from the optical image reader 401.

The digital image signal from the optical image reader 401 is subjected to digital processing, such as correction and conversion, in the signal processor 402. In the signal processor 402, first, a normalizer 403 normalizes the image signal. This normalizer 403 is also called a shading correction circuit which performs the same shading correction as described with reference to the first embodiment, and corrects a variation in gain and offset of the optical image reader 401 in the main scanning direction, which are originated from a variation in sensitivity of each light receiving element of the line sensor 414, a variation in dark current, a variation in irradiation of the irradiation light source in the main scanning direction, or the like. The specific structure of this normalizer 403 is disclosed in, for example, Japanese Patent Application No. 59-192663. The image signal is normalized by the normalizer 403 to be "1" when the original is white and "0" when it is black. In an apparatus for reading a color image using a color sensor for the line sensor 414, the normalizer 403 automatically corrects the white balance.

Then, the image signal normalized by the normalizer 403 is subjected to enlargement/reduction processing or by an enlargement/reduction circuit 404, which in turn outputs an image signal of a predetermined discrete density.

The enlargement/reduction processing is conducted in this invention by changing the scanning speed of the carriage for the enlargement/reduction in the subscanning direction and by the enlargement/reduction circuit 404 for the enlargement/reduction in the main scanning direction.

Figure 9:
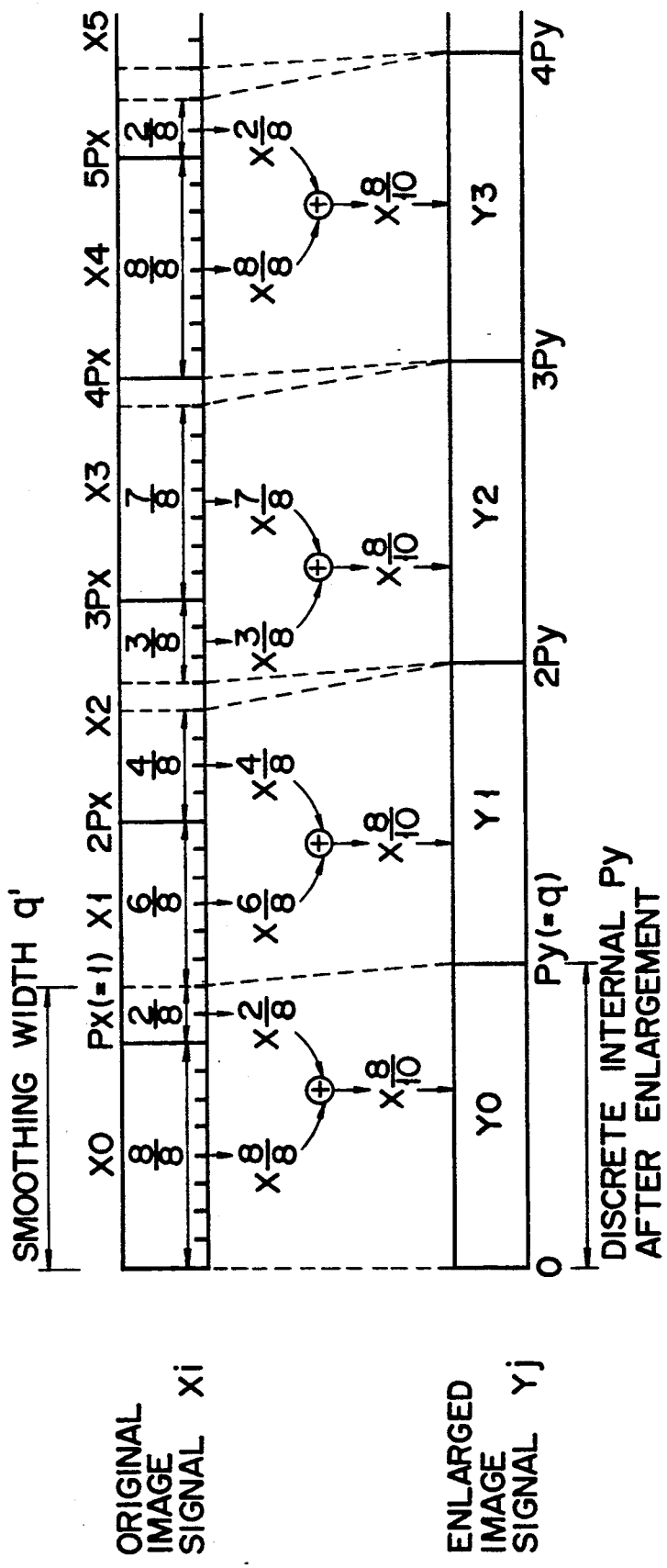
FIG. 9 is a diagram for explaining how to perform an operation in one embodiment of a enlargement/reduction method of the present invention.
Figure 10:
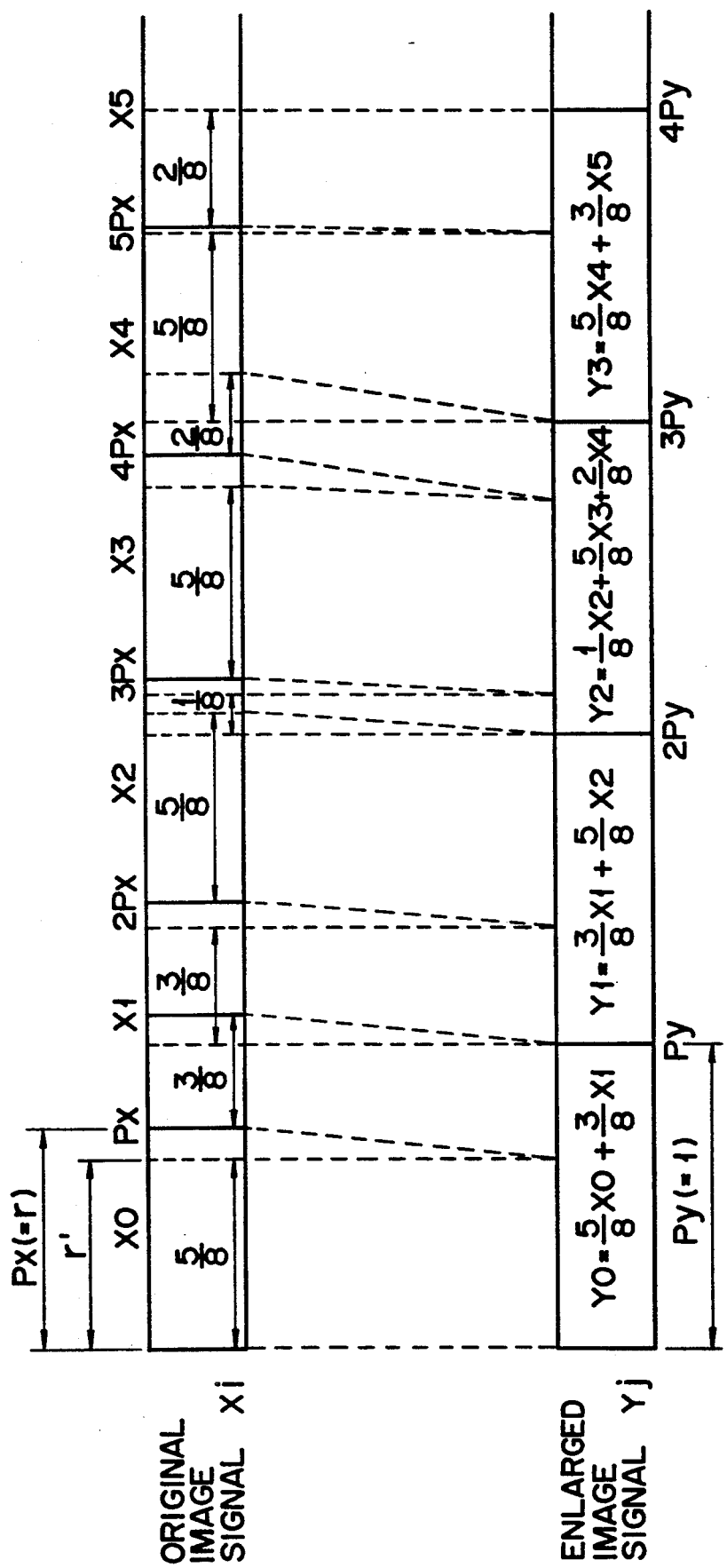
FIG. 10 is a diagram for explaining how to perform an operation in another embodiment of an enlargement/reduction method of the present invention.

Referring now to FIG. 9, the enlargement/reduction processing done by the enlargement/reduction circuit 404 will be described.

For the enlargement/reduction processing, an enlarged/reduced-image signal Yj (j is an integer) of the j-th pixel is acquired from an original image signal Xi (i is an integer and $k \leq i \leq l$) of the i-th pixel using the following equation (1).

$$Yj = r'(-aXk + \sum_{k \leq i < l} Xi + bXl) \quad (1)$$

where r is a specified enlargement/reduction ratio given by a user, etc., q is a reciprocal of the specified enlargement/reduction ratio r, q' is the value q rounded up to m-bit precision, $Aj = j \cdot q + c$ (c: constant) is the pixel position signal of the enlarged/reduced-image signal Yj computed with n-bit precision (m<n), Aj' is the first coarse pixel position signal obtained by rounding up Aj to m-bit precision, $Bj' = Aj' + q'$ is the second coarse pixel position signal computed from Aj' and q'. In the equation (1), k and a respectively represent an integer portion and a decimal portion of Aj', l and b respectively represent an integer portion and a decimal portion of Bj, and r' is the reciprocal of q' rounded up to m-bit precision, i.e., an enlargement/reduction ratio rounded up to m-bit precision.

The equation (1) shows that the enlarged/reduced-image signal Yj is obtained by determining weight coefficients a and b with respect to, for example, the reference pixel range i ($k \leq i \leq l$) of the original digital image signal Xi and the original image signals Xk, Xl on both ends of the reference pixel range, from the first and second coarse pixel position signals Aj' and Bj'.

The equation (1) or the operation by the enlargement/reduction processing method will be further described in detail referring to FIG. 9.

Given the specified reduction ratio r=11/15, with the bit precision m being 3, the reciprocal of r is q=15/11=1.36. Rounding up r yields q'=10/2³=10/8, and the rounded reduction ratio becomes r'=8/10=0.8. As the constant c corresponds to a deviation of the origin between the original image and the enlarged/reduced-image signal, it should be properly be set depending on where the edge of each image is.

The following shows an example of computation of the enlarged/reduced-image signal Yj of each pixel.

For j=0,

From A=A0'=0 (c=0), k=a=0, and from B0'(=A0'+q')=1.25, then, l=1, b=0.25. Thus, the reduced-image signal Y0 for j=0 is:

$$Y0 = 0.8 \, (X0 + 0.25X1).$$

For j=1,

From A1=1.36, A1'=1.25, B1'(=A1'+q')=2.5, then, k=1, a=0.25, l=2, and b=0.5. Thus, the reduced-image image signal Y1 for j=1 is:

$$Y1 = 0.8\{(-0.25X1) + X1 + 0.5X2\}$$
$$= 0.8(0.75X1 + 0.5X2).$$

For j=2,

From A2=2.72, A2'=2.625, B2'(=A2'+q')=3.875, then, k=2, a=0.625, l=3, and b=0.875. Thus, the variable reduced-image signal Y2 for j=2 is:

$$Y2 = 0.8\{(-0.625X2) + X2 + 0.875X3\}$$
$$= 0.8(0.375X2 + 0.875X3).$$

For j=3,

From A3=4.08, A3'=4.0, B3'(=A3'+q')=5.25, then, k=4, a=0, l=5, and b=0.25. Thus, the reduced-image signal Y3 for j=3 is:

$$Y3 = 0.8(X4 + 0.25X5).$$

The enlarged/reduced-image signals Yj are sequentially determined in the same manner.

In the enlargement/reduction processing described above, the precision of the enlargement/reduction ratio of the variable enlarged/reduced-image is determined by the precision (n-bit precision) of the pixel position signal Aj. The precision of Aj can be improved by simply increasing the bit length of an adder (to be described later) that adds q, so that the enlargement/reduction ratio can be set with high accuracy with less hardware.

According to this invention, the following equation (2) may be used instead of the equation (1) to carry out the same enlargement/reduction processing.

$$Yj = (a'Xk + \sum_{k < i < l} r'Xi + bXl) \quad (2)$$

where r' is the specified enlargement/reduction ratio r rounded up to m bits, k is the maximum integer to satisfy $k \cdot r + c < j$ (c: constant), and a' is a decimal portion, a, of (k+1)r rounded up to m bits. Further, l'=INT[(-1-a')/r'], $b=(1-a')-l' \cdot r'$, and l=k+l'+1. INT[ ] represents an integer portion of the value in [ ].

Given the specified reduction ratio r=11/15=0.73, with the bit precision m being 3, r'=⅘. Since the constant c corresponds to a deviation of the origin between the original image and the reduced-image signal as per the case of the equation (1), it should be properly be set depending on where the edge of each image is.

For j=0,

From k=−1 (c=0), a=a'=0, l'=INT[1/(⅘]=1, then l=1, and b=1−⅘=⅕, so that Y0=⅘X0+⅕X1.

For j=1,

From k=1, a=0.46, a'=⅔, l'=1, then l=3, and b=0, so that $Y1 = \frac{2}{3}X1 + \frac{1}{3}X2$. Accordingly, the enlarged/reduced-image signals Yj are sequentially acquired.

In the enlargement/reduction processing of the equation (2), the precision of the enlargement/reduction ratio of the enlarged/reduced-image is determined by the precision of k·r. The precision of k·r can be improved by simply increasing the bit length of an adder that adds r, so that the enlargement/reduction ratio can be set with high accuracy with less hardware, as per the enlargement/reduction processing done by the equation (1).

FIG. 11 is a block diagram illustrating a specific structure of an enlargement/reduction circuit to which the enlargement/reduction processing by the equation (1) or (2) is applied. This circuit includes two line buffers 504 and 506 at the input section. An original image signal is written in one of the line buffers in response to transfer clock CK1, and an original signal is read out from the other line buffer in response to a read clock CK2 and is then transferred to latches 509–911. The read clock CK2 is synchronized with an internal clock CK3 (not shown) which is twice as fast as or faster than the transfer clock CK1.

Selectors 501 and 508 switch between the read/write mode of the line buffers 504 and 506, and selectors 502 and 503 switch an input clock to address generators 505 and 507 which generate address data to the line buffer 504 and 506, respectively.

Original image signals X1 to X3 from the latches 509–511 are multiplied by interpolation coefficients P1 to P3 from a controller 517 in multipliers 512 to 514. The multiplication results of the multipliers are added together by an adder 515. The output of the adder 515 is multiplied by a normalizing coefficient by a multiplier 516, and is then latched in a latch 519 via a selector 518 in response to the transfer clock CK1, thus yielding an enlarged/reduced-image signal Y corresponding to the equation (1). The normalizing coefficient is r' in the equation (1).

The controller 517 outputs the interpolation coefficients P1–P3 and read clock CK2 according to the equation (1). These interpolation coefficients would take such values that P3 is b, P2 is 1 or 1−1, and P1 is 1−a or 0; a and b are the same as used in the equation (1). The read clock CK2 is output by the movement of the reference position of a pixel of the original image signal (or the number of pixels) for one interpolation processing.

Figure 12:
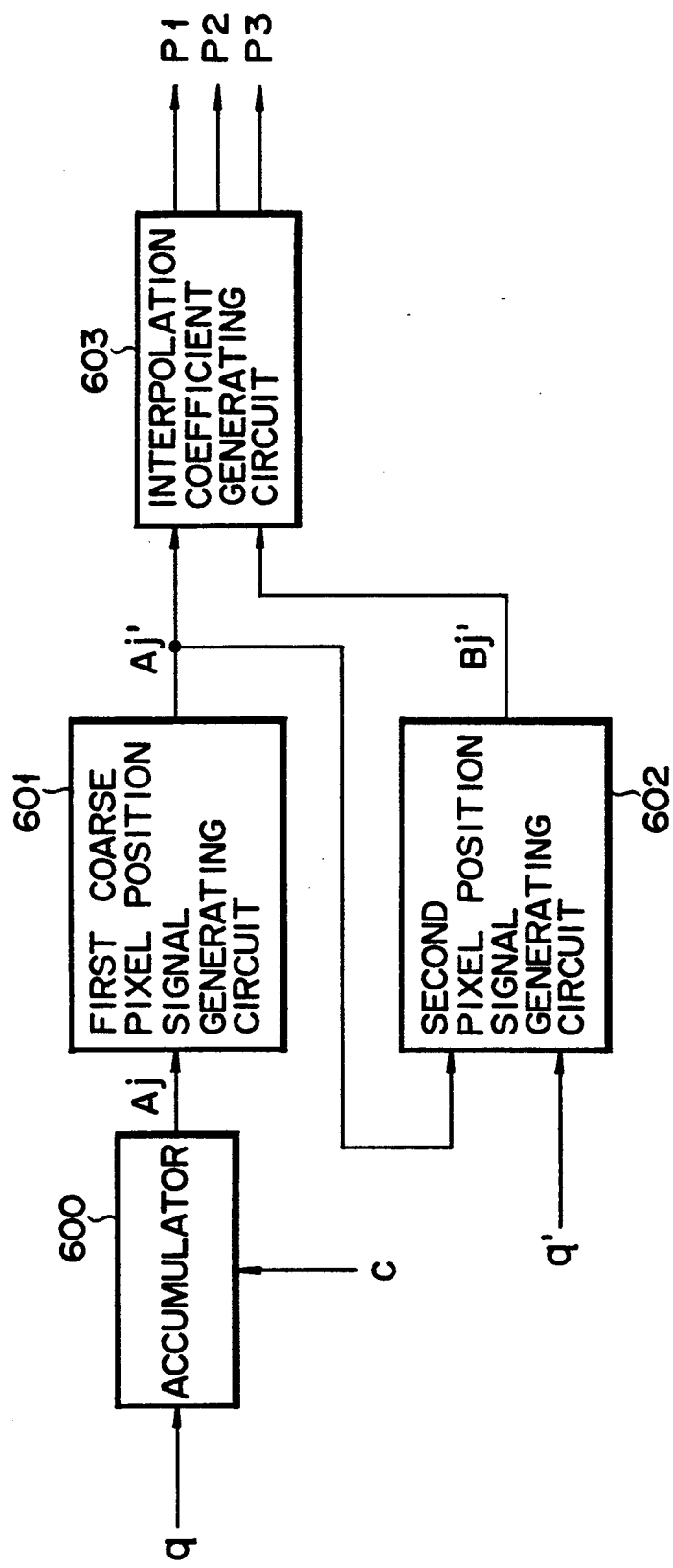
FIG. 12 is a functional block diagram of part relating to generation of an interpolation coefficient in the controller shown in FIG. 11.

FIG. 12 is a block circuit involved in generating the interpolation coefficients P1–P3 in the controller 517. This circuit comprises an accumulator 600, first and second coarse pixel-position signal generators 601 and 602, and an interpolation coefficient generator 603. The accumulator 600 computes the pixel position signal Aj of the enlarged-image signal Yj given by the equation (1), and performs accumulation of Aj=j·q+c (c:constant). The first coarse pixel-position signal generator 601 rounds u the pixel position signal Aj from the accumulator 600 to m-bit precision to produce the first coarse pixel position signal Aj'. The second coarse pixel-position signal generator 602 computes Bj'=Aj'+q' from Aj' and rounded q' (to m-bit precision) to provide the second coarse pixel position signal Bj'. The first and second coarse pixel position signals Aj' and Bj' are input to the interpolation coefficient generator 603, which in turn generates the interpolation coefficients P1 to P3.

The enlargement/reduction circuit shown in FIG. 11 can also perform the enlargement/reduction processing given by the equation (2). In this case, the interpolation coefficients would take values such that P3 is 1−b, P2 is a' or r' and P3 is 0 or a', and the output signal of the adder 515 needs to be selected as the enlarged/reduced-image signal by the selector 518. Actually, performing the enlargement/reduction processing of either the equation (1) or (2) is sufficient.

With the above structure, the enlarged/reduced-image signal can be output in synchronism with the transfer clock of the original image signal.

The enlargement/reduction circuit shown in FIG. 11 cannot perform reduction with a reduction ratio smaller than ½; however, such reduction may be realized by increasing the number of latches and multipliers and the bit length of the adders, and increasing the frequency of the internal clock CK3 per cycle of the transfer clock CK1.

A description will now be given of the reasons why moire noise is significantly difficult to occur by the enlargement/reduction method of the present invention.

It is well know that in general, if a continuous signal is made discrete at a discrete interval P, a so-called aliasing occurs and the frequency component of the original signal equal to or greater than f/2 is shifted below f/2, where f is a discrete frequency and is a reciprocal of the discrete interval P. In making a continuous signal discrete, therefore, the frequency component of the original continuous signal equal to or greater than f/2 is eliminated by a low-pass filter prior to the discrete operation, thus preventing the aliasing.

What is significant in the aliasing is that, when the original continuous signal contains a peak of a high-frequency component such as a modulation carrier, the peak is shifted to the low-frequency region by the aliasing, thus deteriorating the signal's quality; this deterioration is a so-called moire phenomenon. In the case of an image, for instance, if printed dots which are difficult to visually detect are shifted to a low frequency region with a high visibility by the aliasing, a moire pattern which does not originally exist on the image is observed and considerably deteriorates the image quality. The deterioration of the image quality is mostly reduced by eliminating those peaks of a frequency which cause moire.

The enlargement/reduction processing is conversion processing of a discrete density, which may be considered as a combination of continuation of the original discrete signal—convolution process with a certain function—and re-discrete. For instance, according to the linear interpolation, the original discrete signal Xi with the discrete interval (original discrete interval) Px is taken as a continuous signal having a value only at the discrete lattice points as shown in FIG. 13A, a linear interpolation function h(t) having an impulse response shown in FIG. 14A is convoluted in the continuous signal, and the resultant signal Z(t) as illustrated in the graph given in FIG. 13B can be taken as the signal Yj as shown in FIG. 14C, which is made re-discrete at a new discrete interval (re-discrete interval) Py.

According to the enlargement/reduction of the present invention, the original discrete signal Xi is also taken as a continuous signal, and smoothing is performed by obtaining convolution of a function h''(t) having an impulse response as shown in FIG. 14C with the smoothing interval q'. Px substantially equal to the re-discrete interval Py, in a signal Z'(t) as shown in the graph in FIG. 15A, which results from convolution of a function h'(t) having an impulse response shown in FIG. 14B in the continuous signal, and a signal Yj shown in the graph in FIG. 15C, which is acquired by a re-discrete operation performed on the smoothing-originated signal Z''(t) illustrated in the graph given in FIG. 15B, at the re-discrete interval Py, is computed. Here, q' is a reciprocal of the specified magnification r rounded up to the proper bit precision. The above sequence of operations is given by the following equation (3).

$$Z(t) = h(t) * X(t)$$
$$Z'(t) = h'(t) * X(t)$$
$$Z''(t) = h''(t) * Z'(t)$$
(3)

where "*" indicates convolution.

FIGS. 16A and 16B respectively illustrate the linear interpolation and the characteristic of the enlargement/reduction processing in this invention. They are a Fourier transform H(f) of h(t) and a Fourier transform H'(f)·H''(f) of h'(t)*h''(t), respectively.

In the diagrams, fx and fy are reciprocals of the original discrete interval Px and re-discrete interval Py, respectively. For the former Fourier transform, there is a zero point only at the frequency fx, whereas for the latter case, there are zero points at the close proximities of the frequencies fx and fy. Suppose that the original discrete signal has a peak at the frequency fy+Δf(Δf is close to 0). This may happen not only when the original continuous signal has that frequency component, but also when the low-frequency component of the original signal (fx−fy−Δf) is convoluted by a discrete operation and is shifted to a lower frequency fy+Δf. These frequency components are convoluted through a discrete operation (frequency fy) and are shifted to lower frequencies, which generates moire noise. Through the linear interpolation, the frequency component fy+Δf is reduced to some degree, but the moire noise may be produced because the response at the frequency fy may increase depending on the magnification.

In contrast, according to the enlargement/reduction processing of the present invention, the frequency response in the interpolation processing becomes almost 0 at fy, so that the frequency fy+Δf which is very close to that frequency and would cause moire noise can mostly be eliminated before the re-discrete operation. This can therefore prevent the moire noise from occurring.

The following describes why the present invention does not cause lattice noise even with a coarse bit precision. The "lattice noise" is a noise originating from a deviation of the interpolation coefficients at the time an enlarged/reduced image is acquired.

FIGS. 17A through 17C illustrate various enlargement/reduction methods in a case where the pitch between the pixels of the original image is divided by 3 bits (i.e., into 8 sections). Here, the specified reduction ratio is 11/15, and aj and bj respectively represent both ends of the reference range for the individual pixels of a reduction ratio with respect to the original image.

The enlargement/reduction method shown in FIG. 17A involves a coarse interpolation accuracy of the projection method; q (reciprocal of the specified enlargement ratio) is expressed as 15/11=10.9/8, and an enlarged image is acquired with aj=bj.−1=fn(j·q)

where fn( ) means rounding up with 3 bits below the decimal point. According to this enlargement/reduction method, the original-image reference region per pixel of the enlarged image is not always constant, thus causing splashing noise.

The enlargement/reduction method shown in FIG. 17B obtains an approximation of the enlargement/reduction ratio at 2n/k (n and k being integers) and an approximation of the reciprocal q' of the enlargement ratio at 10/8, and acquires an enlarged image with aj=bj−1=j·q'. According to this enlargement/reduction method, since the original-image reference region per pixel of the enlarged/reduced image is constant, lattice noise does not occur. However, this method rounds up the enlargement/reduction ratio itself, so that the ratio cannot be set at high accuracy. In addition, as setting the enlargement/reduction ratio at high accuracy requires an increase in the number of divided bits, n, between pixels, which would inevitably enlarge the apparatus itself.

The enlargement/reduction method shown in FIG. 17C is a projection method according to the present invention; q (reciprocal of the specified enlargement ratio) is expressed as 15/11=10.9/8, and an enlarged image is acquired with q'=fn(q), aj=fn(j·q), and bj=aj+q'. According to this method, therefore, as the reference region of the original image per pixel of the enlarged image is constant (q'), no lattice noise occurs. In addition, the re-discrete position of the enlarged image (re-sampling position), aj, itself is computed using highly-accurate q, it is possible to set the enlargement/reduction ratio at high accuracy without increasing the circuit scale so much.

Although only the conversion of a one-dimensional discrete density is executed as enlargement/reduction processing in the above embodiments, the present invention is not particularly limited to this case. For instance, an original image signal defined on the z-y axis may be subjected first to enlargement/reduction along the x axis, then to enlargement/reduction along the y axis, thereby ensuring two-dimensional enlargement/reduction. In this case, enlargement/reduction processing according to the movement of the carriage does not need to be performed. Of course, the enlargement/reduction processing according to this embodiment and the enlargement/reduction processing by the movement of the carriage may be used together.

In addition, although the enlargement/reduction processing (discrete density conversion process) is performed by a signal processor in the above embodiment, the same processing may be executed by software under the control of CPU in accordance with the same conversion equations, producing the same effects.

According to the present invention, the enlargement/reduction processing can be executed by a structure with less operations, which is suitable for a real-time signal processing, while suppressing moire noise or lattice noise, and can set the enlargement/reduction ratio at high accuracy.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image processing apparatus comprising:
   image-area discriminating means for discriminating an attribute of an image on the basis of an image signal and outputting a discrimination result as an image-attribution signal;
   enlargement/reduction processing means for subjecting said image to enlargement/reduction processing with a predetermined enlargement/reduction ratio; and
   filtering means, connected to said image-area discriminating means and said enlargement/reduction processing means, which controls a spatial frequency component of said image signal, in accordance with said image-attribution signal and said enlargement/reduction ratio, wherein said filtering means comprises a one-dimensional spatial filter for performing one-dimensional filtering on an output signal of said enlargement/reduction processing means in accordance with said discrimination signal and wherein said spatial filter includes averaging means for obtaining a moving average of said output signal of said enlargement/reduction processing means and a $\gamma$ circuit for controlling a $\gamma$ characteristic of an output signal of said averaging means.

2. An apparatus according to claim 1, wherein said enlargement/reduction processing means comprises a line memory for storing an image signal, address controlling means for applying a read address signal to said line memory, enlargement/reduction operation means for performing enlargement/reduction processing on an image signal read out from said line memory, and coefficient generating means for outputting an interpolation coefficient according to an enlargement/reduction ratio and an address signal.

3. An apparatus according to claim 1, wherein said filtering means includes Laplacian operation means for acquiring a high frequency signal component of the image and outputting a Laplacian signal, and high frequency emphasis processing means for processing said high frequency signal component and said image signal in accordance with a discrimination result of said image-area discriminating means and said enlargement/reduction, to subject said image signal to high-frequency emphasis processing.

4. An apparatus according to claim 3, wherein said image-area discriminating means comprises means for discriminating an attribute of an image by a binary pattern of said high frequency signal component.

5. An apparatus according to claim 3, wherein said high-frequency emphasis processing means comprises coefficient generating means for generating a coefficient determined by said discrimination result and said enlargement/reduction ratio, multiplying means for multiplying said high frequency signal component by said coefficient and outputting a resultant signal, and adder means for adding said resultant signal of said multiplying means and said image signal.

6. An apparatus according to claim 5, wherein said coefficient generating means includes means, having a table with a plurality of coefficients determined by an attribute of an image and an enlargement/reduction ratio, for selectively outputting said coefficients in accordance with said discrimination signal and said enlargement/reduction ratio.

7. An image processing apparatus comprising:
   image-area discriminating means for discriminating an attribute of an image on the basis of a binary pattern of a high frequency signal component of an image signal and outputting a discrimination result as an image attribution signal representing one of a plurality of likelihoods between a likelihood to a character and a likelihood to a half tone image;
   enlargement/reduction processing means for subjecting said image to enlargement/reduction processing with a predetermined enlargement/reduction ratio;
   storing means for storing a plurality of parameters, each being predetermined by the discrimination result and the enlargement/reduction ratio, and selectively outputting the parameters in accordance with the image attribution signal and the enlargement/reduction ratio; and
   filtering means, connected to said storing means, for filtering a spatial frequency component of said image signal in accordance with one of the parameters which is read out from said storing means, said filtering means including Laplacian operation means for acquiring the high frequency signal component of the image signal and outputting a Laplacian signal, and high frequency emphasis processing means for processing said high frequency signal component and said image signal in accordance with one of the parameters which is read out from said storing means, to subject said image signal to high-frequency emphasis processing, said high-frequency emphasis processing means including multiplying means for multiplying the high frequency signal component by said one of the parameters and outputting a resultant signal, and adder means for adding the resultant signal of said multiplying means and the image signal;
   wherein said filtering means includes averaging means for obtaining a moving average of said output signal of said enlargement/reduction processing means and a $\gamma$ circuit for controlling a $\gamma$ characteristic of an output signal of said averaging means.

8. An image processing apparatus for processing an image signal corresponding to a predetermined image for each line, comprising:
   two-dimensional spatial filtering means for performing two-dimensional spatial filtering on said image signal;
   image-area discriminating means for discriminating an attribute of said image and outputting a discrimination signal;
   enlargement/reduction processing means for executing one-dimensional enlargement/reduction on an image signal processed by said two-dimensional spatial filtering means; and
   one-dimensional spatial filtering means for executing one-dimensional spatial filtering on an image signal processed by said enlargement/reduction processing means in accordance with said discrimination signal and controlling a spatial frequency response of said image signal;
   said two-dimensional spatial filtering means including means for controlling a spatial frequency response of said image signal in accordance with said discrimination signal,
   said image-area discriminating means including means for discriminating said attribute in accordance with a processing result of said two-dimensional spatial filtering means.

9. An enlargement/reduction processing apparatus for a digital image signal, comprising:
  accumulating means for accumulating a constant determined by a predetermined initial value and a specified enlargement/reduction ratio and outputting a pixel position signal with a precision of a first bit length;
  means for rounding up a pixel position signal from said accumulating means to a precision of a second bit length smaller than said first bit length to provide a first coarse pixel position signal;
  means for producing a second coarse pixel position signal from said first coarse pixel position signal and one of a coarse enlargement/reduction ratio obtained by rounding up said specified enlargement/reduction ratio and a coarse enlargement/reduction ratio obtained by rounding up a reciprocal of said specified enlargement/reduction ratio;
  first multiplying means for multiplying an original digital image signal by an interpolation coefficient determined by said first and second coarse pixel position signals to provide a plurality of multiplication results;
  adder means for adding said plurality of multiplication results; and
  second multiplying means multiplying an adding result from said adder means by a normalizing coefficient determined by said coarse enlargement/reduction ratio and outputting a digital image signal undergone enlargement/reduction processing.

10. An enlargement/reduction processing apparatus for a digital image signal, comprising:
  accumulating means for accumulating a constant determined by a predetermined initial value and a specified enlargement/reduction ratio and outputting a pixel position signal with a precision of a first bit length;
  means for rounding up a pixel position signal from said accumulating means at a precision of a second bit length smaller than said first bit length to provide a first coarse pixel position signal;
  means for producing a second coarse pixel position signal from said first coarse pixel position signal and a coarse enlargement/reduction ratio obtained by rounding up said specified enlargement/reduction ratio;
  multiplying means for multiplying an original digital image signal by an interpolation coefficient determined by said first and second coarse pixel position signals and said coarse enlargement/reduction ratio to provide a plurality of multiplication results; and
  adder means for adding said plurality of multiplication results and outputting a digital image signal undergone coefficient processing.

11. A method of performing enlargement/reduction processing on a digital image signal in accordance with an enlargement/reduction ratio specified in an image processing apparatus, said method comprising the steps of:
  computing a pixel position signal of an enlarged/reduced image signal with a first bit length and representing a value less than a decimal fraction;
  rounding up said computed pixel position signal with an accuracy of a second bit length less than that of said first bit length and representing a value less than a decimal fraction, to provide a first coarse pixel position signal;
  computing a second coarse pixel position signal from said first coarse pixel position signal and one of a coarse enlargement/reduction ratio obtained by rounding up said specified enlargement/reduction ratio and a coarse enlargement/reduction ratio obtained by rounding up a reciprocal of said specified enlargement/reduction ratio; and
  computing said enlarged/reduced-image signal in accordance with said first and second coarse pixel position signals.

* * * * *